March 17, 1936.  W. M. STRATFORD  2,034,317
PROCESS OF PRODUCING MOTOR FUEL
Filed June 20, 1932
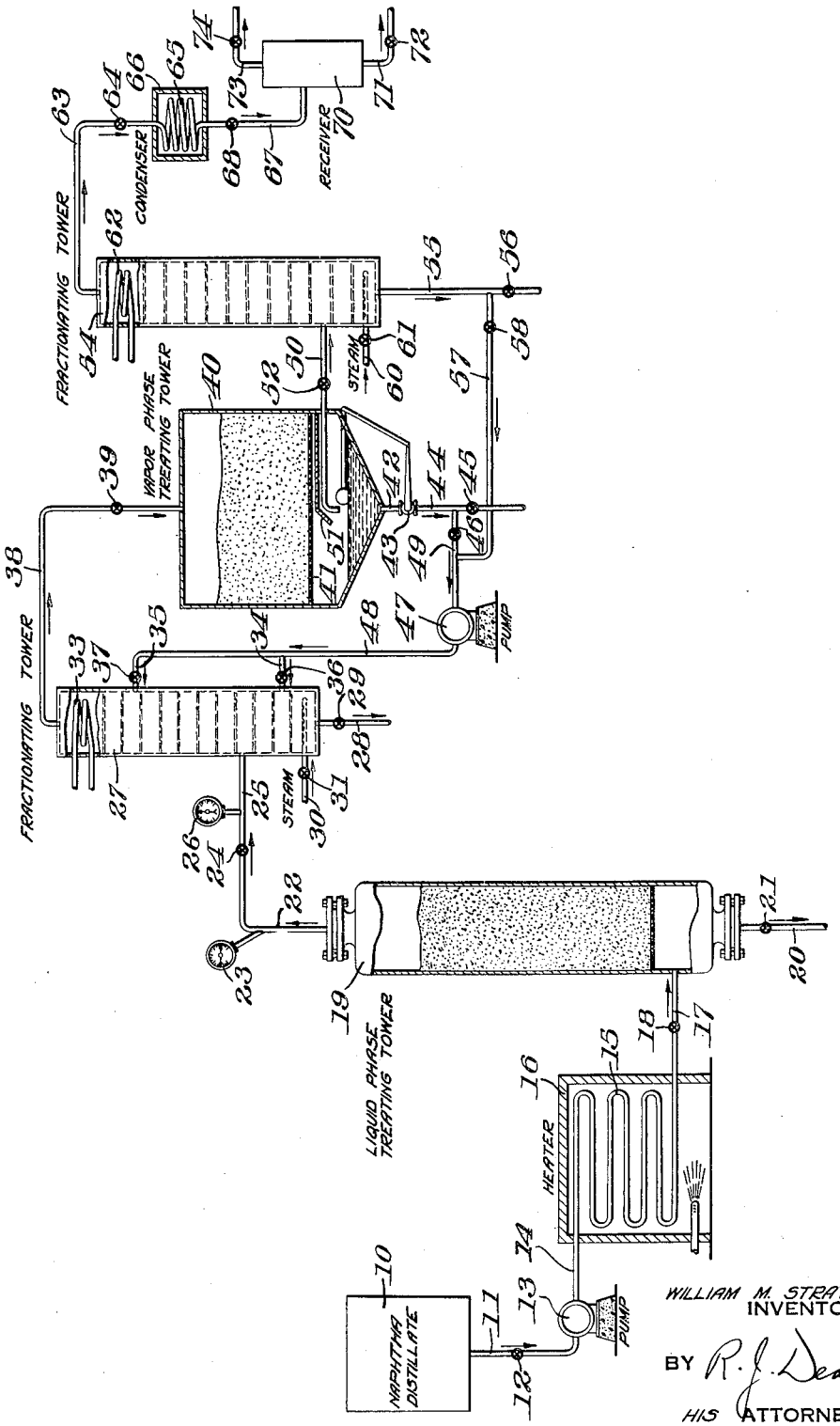
WILLIAM M. STRATFORD
INVENTOR
BY R. J. Dearborn
HIS ATTORNEY Patented Mar. 17, 1936

2,034,317

UNITED STATES PATENT OFFICE 2,034,317

PROCESS OF PRODUCING MOTOR FUEL

William M. Stratford, New York, N. Y., assignor to The Texas Company, New York, N. Y., a corporation of Delaware Application June 20, 1932, Serial No. 618,123

4 Claims. (Cl. 196—147)

This invention relates to the treatment of hydrocarbon oils and more particularly to the treatment of distillates obtained by cracking petroleum or other hydrocarbons which may contain unstable, unsaturated compounds.

The invention contemplates a method of treating and purifying hydrocarbon oils such as cracked naphtha, which contain undesirable, unsaturated compounds, which includes contacting the naphtha under substantially liquid phase conditions and at elevated temperature under superatmospheric pressure, with a suitable contact catalyst whereby said undesirable, unsaturated compounds are polymerized to compounds of higher boiling point, distilling the treated naphtha from said higher boiling polymerized compounds, and then contacting the treated distilled naphtha under vapor phase conditions with a suitable contact catalyst whereby any remaining undesirable, unsaturated compounds are polymerized to compounds of higher boiling point than the treated and purified naphtha and are thereby separated from said naphtha.

When hydrocarbons such as cracked naphtha and the like, containing certain types of unstable and undesirable, unsaturated compounds, for example, the diolefines, are contacted at elevated temperatures and in the liquid state with catalytic adsorbents which are active at such temperatures, a polymerization of the unstable, unsaturated compounds takes place. Such a polymerization results in the formation of new compounds known as polymers having boiling points higher than those of the original unsaturated compounds. This characteristic of the polymers permits of their ready separation from the treated naphtha by means of a distillation of the liquid treated product in which they are present.

Such liquid phase methods of treating cracked naphtha may be satisfactory for the treatment of most types of naphtha distillates. However, in the case of some of the more highly unsaturated distillates produced by certain specific cracking conditions, the products of a liquid treatment may be unstable when exposed to oxidation or to long storage. This instability may be due either to the presence of small quantities of undesirable, unsaturated compounds remaining in the oil or to partly polymerized compounds which have been formed during the liquid phase treatment. This characteristic may not be due to any inherent deficiency of the liquid phase treating process but may result from the fact that a sufficiently long time of contact between the oil and the catalytic adsorbent is not economically possible.

It is appreciated that by subjecting hydrocarbons containing unstable, unsaturated compounds to a treatment in the vapor phase with certain catalytic adsorbents, that a very complete separation of these unstable materials is possible without in any way effecting those unsaturated compounds which, by their presence, enhance the anti-detonating qualities of the product. It is not, however, suited to the treatment of hydrocarbons containing large percentages of unsaturated bodies since these, when polymerized, have a tendency to be adsorbed and may poison the catalyst.

In accordance with the invention, the advantages of treating cracked naphtha both in the liquid and in the vapor phase are obtained yielding results not obtainable by the employment of either method alone. The liquid phase treatment serves as a vigorous means of removing the bulk of the unstable, unsaturated compounds. Because of the higher pressures and higher temperatures employed in this treatment the actual polymerization per unit weight of catalyst employed is high and the polymers which are formed are continuously and concurrently washed out of the adsorbent by the associated portions of the naphtha. The vapor phase treatment which is carried out at a somewhat lower pressure and temperature serves effectively to polymerize and separate any undesirable, unsaturated constituents which may not have been removed or which may have been formed during the liquid phase treatment.

Thus, by the practice of the present invention, cracked napthas derived from any type of cracking process and including those naphthas which are particularly refractory to ordinary treating methods, can be purified and stabilized to yield motor fuel of a most satisfactory merchantable quality.

A particular advantage of the invention lies in the fact that each of the two processes of treating may be worked at their highest efficiency without decreasing substantially the lives of the adsorbents.

The invention will be fully understood from the following description taken in connection with the drawing which represents in diagrammatic sectional elevation, an apparatus which may be employed for carrying out the process. The apparatus illustrated in the drawing is shown and described merely for the purpose of aiding and understanding the process and it is to be understood that any other suitable apparatus may be substituted for that shown.

In the figure, the numeral 10 designates a storage for a supply of a cracked naphtha distillate which is to undergo treatment. This storage is connected through the line 11 controlled by valve 12 with the inlet of the charge pump 13. This pump is connected through the line 14 with the coils 15 of a suitable heater 16, which may be of any of the conventional types.

The outlet of the heater coils is connected to the line 17 controlled by the valve 18, which line enters the high pressure treating chamber 19 at a lower point in its structure. The bottom of this pressure treating vessel is provided with a draw-off line 20 controlled by the valve 21. Situated within this treating vessel there is a bed of a suitable catalytic adsorbent, such for example as fuller's earth, the character of which is dependent upon the operation of the process. The top of the treating chamber 19 is provided with a liquid draw-off line 22 which is fitted with a high pressure gauge 23 for following the pressures existent within the pressure treating vessel. The draw-off line 22 connects with an expansion valve 24, the outlet of which is in turn connected by a line 25 to a lower point of the fractionating tower 27. This line 25 is provided with a pressure gauge 26 which assists in controlling the extent of the expansion possible by the manipulation of the expansion valve 24.

The fractionating tower 27 may be of the conventional type, so constructed as to withstand the pressures to which it may be subjected. It is fitted at its lowest point with a draw-off line 28 controlled by the valve 29. Into a lower point of its structure there is fitted a steam spray 30 which is provided with a control valve 31. At an upper point of the fractionating tower there is situated the cooling coil 33, the purpose of which is to supply reflux cooling for fractionation. At points intermediate the top and bottom of the tower there are introduced lines 34 and 35 controlled respectively by the valves 36 and 37 which serve a function which will be hereinafter described.

The uppermost point of the fractionating tower 27 communicates through the vapor line 38, controlled by the valve 39 with the top of the suitably insulated vapor treating tower 40. Situated within this tower there is a bed of suitable adsorbent catalyst such as fuller's earth or the like. This bed of catalytic adsorbent may be advantageously supported upon a reinforced screen 41; however, any other satisfactory methods of supporting the bed of adsorbent catalyst may be used. The lowest point of the vapor treating tower 40 is fitted with a draw-off line 42 controlled by the automatic valve 43. The discharge side of this valve is provided with the line 44 controlled by the valve 45 which line may lead to a suitable storage chamber.

There is fitted into the line 44 a branch line 49 controlled by the valve 46 which communicates with the inlet side of the recirculating pump 47 which pump in turn discharges into the line 48. This line connects with both the lines 34 and 35 which enter the fractionating tower 27 at various points as shown.

Below the bed of catalytic adsorbent a vapor draw-off line 50, which may be protected from any descending liquid by the baffle plate 51, is connected through the valve 52 with a lower point of the fractionating tower 54. The bottom of this fractionating tower 54 is fitted with a line 55 controlled by the valve 56. Leading into this line there is the line 57 controlled by the valve 58 which enters the line 49 at a point intermediate the valve 46 and the pump 47. At a lower point in the fractionating tower structure there is provided a steam spray 60 controlled by the valve 61. At an upper point in the fractionating tower there is situated a cooling coil 62 which is used for supplying reflux cooling.

The uppermost point of the tower 54 is provided with a vapor draw-off line 63 controlled by the valve 64 which communicates with the inlet 10 of the condenser coil 65 of the condenser 66. The outlet of the condenser coil enters the line 67 controlled by the valve 68 which line communicates with the separator 70. The bottom of this separator is fitted with a liquid draw-off line 71 controlled by the valve 72 which line communicates with a suitable storage tank (not shown) for the liquid product. The top of the separator chamber is supplied with a vapor draw-off line 73 controlled by the valve 74 which line connects the vapor space of the separator with a gas compression plant or a suitable storage for the gases produced in the process.

In the operation of the process in connection with an apparatus such as that illustrated in the figure, a cracked naphtha distillate, which may contain a varying percentage of hydrocarbons suitable for use as motor fuels, is drawn from the naphtha storage tank 10 and delivered to the charge pump 13. This pump is of the high pressure type capable of delivering oil under pressures of from 1000 to 3000 lbs. per sq. in. or more. The naphtha is pumped through the heating coils 15 of the heater 16 where its temperature may be raised to a suitable working temperature which may be in the range of from 400 to 700° F. Under the existing pressures which may be the full working pressure of the charge pump 13 the naphtha is maintained substantially in the liquid phase.

It may be desirable to submit the untreated naphtha to a preliminary stabilizing operation whereby low boiling hydrocarbons and non-condensable gases may be substantially removed. Such compounds if allowed to remain in the naphtha would be selectively adsorbed by the adsorbent and in this manner would reduce the over-all efficiency of the catalyst and of the polymerization.

The heated naphtha is delivered from the heater coil outlet through the valve 18 and passes into the high pressure treating chamber 19 where it is forced through the bed of catalytic adsorbent which is present therein. The treating chamber is heavily insulated and a temperature of 400° to 700° F. is maintained therein, the pressure being preferably in excess of 1000 lbs. per square inch. By controlling the rate of charge of the heated oil through the pressure vessel, the time of contact between the oil and catalytic adsorbent may be closely controlled. During this period of contact, the catalytic adsorbent brings about the polymerization of the unstable unsaturates present in the untreated naphtha distillate. Some of the polymers which are formed in this way may become absorbed by the adsorbent but, under the conditions of temperature and pressure existing in the treating chamber, the greater portion of the polymers are dissolved by the naphtha with which they form a solution.

This solution of polymers in naphtha is drawn off from the pressure treating vessel through the line 22 and the expansion valve 24 where the liquid is flashed into a vapor. The extent of this vaporization is controlled by the difference in pressure existing between the high pressure liquid phase chamber 19 and the pressure maintained in the fractionating tower 27 into which the vapors are flashed. The magnitude of the pressure maintained in the fractionating tower 27 is dependent, to a large extent, upon the naphtha which is being subjected to treatment and may be, for example, between atmospheric pressure and 500 lbs. per square inch.

The fractionating tower 27 is used to bring about the preparation of a vapor fraction having a boiling range differing only slightly from that desired in final treated motor fuel. In the course of this fractionation all those higher boiling polymers which were formed in the liquid phase treatment are substantially separated and are drawn off as a residue from the bottom of the tower through the draw-off line 28. The desired vapor fraction having, for example, an end-point of about 410° F., is drawn off from the top of the tower through the vapor line 38 controlled by the valve 39 and introduced into the top of the vapor phase treating tower 40. The vapors are then caused to pass through the bed of adsorbent catalyst in the tower 40, whereby any remaining unstable, unsaturated compounds are transformed into higher boiling polymers. These polymers separate as liquids since the temperatures maintained in this treating chamber are below the temperatures of vaporization of the polymers. They collect as a liquid together with a certain quantity of unvaporized naphtha at the bottom of the tower from which they are drawn off through the line 42 controlled by the float control valve 43. They may be either passed to a suitable storage tank or they may be caused to pass to the recirculating pump 47 which delivers them under sufficient pressure so that they may be introduced into the fractionating tower 27 at one or more levels in the tower structure such as the points 34 and 35.

The treating tower is preferably operated under a pressure of about 400 lbs. per square inch and, although heavily insulated, enough heat is radiated to effect some condensation of vapors therein.

The vapors are drawn off through the line 50 and the valve 52 and passed into the final fractionating tower 54. By the proper manipulation of the valves controlling the various lines entering the vapor phase treating chamber, working pressures which may vary from that maintained in the fractionating tower 27 to a pressure only slightly above atmospheric may be caused to be maintained therein. In the fractionating tower 54 which has previously been termed the final fractionating tower, a vapor fraction having the boiling range desired in the final motor fuel is prepared. Hydrocarbons having boiling points higher than the end-point of the final treated product separate as liquids and are drawn off from the bottom of the tower through the line 55 controlled by valve 56.

In certain operations of the process it may be desirable to recirculate these residual hydrocarbons to the fractionating tower 27 which is accomplished by causing them to enter the line 49 through the line 57 controlled by valve 58 which connects line 55 with line 49.

In order to bring about complete separation of the desired vapors from the residual oils in the bottom of the tower 54, it may be desirable to introduce steam into the bottom of the tower through the steam spray 60. The final treated vapor fraction which is drawn off from the top of the tower is then delivered through the line 63 and the valve 64 into the condenser coils 65 of the condenser 66 where a substantial condensation is caused to take place. The condensate is drawn off through the line 67 controlled by the valve 68 and delivered into the separator chamber 70 where a separation of undesirable light hydrocarbons and non-condensable gases is caused to take place. The final treated motor fuel is drawn off from the bottom of the separator chamber 10 through the line 71 controlled by the valve 72 and delivered to a suitable storage tank.

The separated undesirable light hydrocarbons and non-condensable gases are drawn off from the vapor space of the separator chamber and delivered through the line 73 controlled by the valve 74 to a gas compression plant or a vapor storage system. In those operations where the vapor phase treatment is carried out under substantial pressures, it may be found desirable to carry out the condensation of the treated vapors under pressure. This is most advantageously accomplished by the proper manipulation of the valves 64 and 67 which control respectively the inlet and the outlet of the condenser coil 65 of the condenser 66.

In the operation of the herein disclosed process, it may be desirable to use adsorbent catalysts such as fuller's earth or the like in both the liquid and the vapor phase treating steps. It may be preferable, however, to use in either one or both of the steps an adsorbent decolorizing clay of the montmorillonite type which has been subjected to a treatment with acid and which exhibits its greatest efficiency at temperatures in excess of 250° F. when used for decolorizing lubricating oils. A material of the type referred to is disclosed in the U. S. Patent No. 1,642,871 issued to Marvin L. Chappell, Richard F. Davis and Merle M. Moore.

After the activity of the adsorbent in either one or both of the steps has been decreased to such an extent so that it will no longer perform its function, it may be found advantageous to stop operating and to treat the adsorbent with saturated or superheated steam. This treatment will tend to remove those polymers which have become adsorbed on the clay and which may have in that way reduced its activity to a low value.

Obviously many modifications and variations of the invention, as hereinbefore set forth, may be made without departing from the spirit and scope thereof, and therefore only such limitations should be imposed as are indicated in the appended claims.

I claim:

1. The process of producing motor fuel having a good color and a low gum content and having good storage properties from a highly cracked naphtha distillate containing undesirable, unsaturated hydrocarbons which comprises heating the naphtha distillate to a temperature in the range of from 600 to 700° F. while maintained in the liquid phase under a pressure in excess of 1000 lbs. per square inch, passing the heated naphtha without substantial reduction in temperature or pressure through a bed of fuller's earth whereby a portion of the undesirable, unsaturated compounds is polymerized to compounds of higher boiling point, substantially reducing the pressure to effect distillation of said naphtha by the contained heat thereof whereby vapors are evolved free from the higher boiling polymerized compounds, passing said vapors under a pressure of approximately 350 to 500 lbs. per square inch through a bed of fuller's earth whereby remaining undesirable, unsaturated compounds are polymerized to compounds of higher boiling point, and separating said polymerized compounds from the treated and purified naphtha.

2. The process of producing motor fuel having a good color and a low gum content and having good storage properties from a highly cracked naphtha distillate containing undesirable, unsaturated compounds which comprises heating said naphtha distillate to a temperature of above 450° F. but below that at which substantial cracking occurs while maintained under a pressure of the order of 1000 pounds per square inch or more, passing the heated naphtha while maintained at such pressure through a bed of solid catalytic adsorbent material whereby a portion of the undesirable, unsaturated compounds is polymerized to compounds of higher boiling point, subjecting said naphtha to distillation and rectification whereby vapors are evolved free from said higher boiling polymerized compounds, passing said rectified vapors through a bed of suitable catalytic adsorbent material maintained under a pressure not higher than 500 pounds per square inch whereby remaining undesirable, unsaturated compounds are polymerized to compounds of higher boiling point, and separating said polymerized compounds from the treated and purified naphtha.

3. The process of producing motor fuel having a good color and a low gum content and having good storage properties from a highly cracked naphtha distillate containing undesirable, unsaturated compounds which comprises heating said naphtha distillate to a temperature of about 450 to 700° F. under a pressure in excess of 1000 lbs. per square inch, passing the heated naphtha without substantial reduction in temperature or pressure through a bed of fuller's earth whereby a portion of the undesirable, unsaturated compounds is polymerized to compounds of higher boiling point, substantially reducing the pressure to effect distillation of said naphtha by the contained heat thereof whereby vapors are evolved free from said higher boiling polymerized compounds, passing said vapors under a pressure of approximately 350 to 500 lbs. per square inch through a bed of fuller's earth, whereby remaining undesirable, unsaturated compounds are polymerized to compounds of higher boiling point, and separating said polymerized compounds from the treated and purified naphtha.

4. The process of producing motor fuel having a good color and a low gum content and having good storage properties from a highly cracked naphtha distillate containing undesirable unsaturated compounds, which comprises subjecting the naphtha, while maintained at an elevated temperature above 450° F. but below a cracking temperature and under a pressure of from 1000 to 3000 pounds per square inch, to contact with a suitable catalytic adsorbent material to effect a polymerization of a portion of said undesirable unsaturated compounds to compounds of higher boiling point, subjecting said naphtha to distillation and rectification under a lower pressure to effect a separation of said higher-boiling polymerized compounds in liquid form while withdrawing naphtha constituents in vapor form, subsequently subjecting naphtha constituents in vapor form to contact with catalytic adsorbent material at a temperature and pressure lower than those obtaining in said previously-mentioned high pressure treating stage to effect a polymerization of remaining undesirable unsaturated compounds to compounds of higher boiling point, and separating said polymerized compounds from the treated and purified naphtha.

WILLIAM M. STRATFORD.